United States Patent [19]

Shimazaki et al.

[11] Patent Number: 4,988,071

[45] Date of Patent: Jan. 29, 1991

[54] MOUNTING MECHANISM FOR AN AUTOMOTIVE AIR CONDITIONING COMPRESSOR

[75] Inventors: Seiji Shimazaki, Isesaki; Soichiro Imai, Maebashi, both of Japan

[73] Assignee: Sanden Corporation, Gunma, Japan

[21] Appl. No.: 313,503

[22] Filed: Feb. 22, 1989

Related U.S. Application Data

[62] Division of Ser. No. 109,863, Oct. 19, 1987, Pat. No. 4,834,336.

[30] Foreign Application Priority Data

Oct. 17, 1986 [JP] Japan .................. 61-159074[U]
Dec. 17, 1986 [JP] Japan .................. 61-193020[U]

[51] Int. Cl.$^5$ ............................................ F04B 35/06
[52] U.S. Cl. ................................... 248/666; 248/638; 248/635; 248/606; 267/141.1
[58] Field of Search ............... 248/666, 638, 562, 634, 248/635, 602, 606; 267/141.2; 384/215, 220, 222, 94, 902, 903, 474

[56] References Cited

U.S. PATENT DOCUMENTS

| | | |
|---|---|---|
| 1,862,483 | 6/1932 | Lord . |
| 2,212,142 | 8/1940 | Austin et al. .................. 267/141.1 |
| 2,540,767 | 2/1951 | Tabbert . |
| 2,901,195 | 8/1959 | Simpson . |
| 3,057,218 | 10/1962 | Knerr et al. .................. 248/606 X |
| 3,274,394 | 9/1966 | Maheu . |
| 3,476,309 | 11/1969 | Harlin . |
| 3,494,540 | 2/1970 | Dixon . |
| 3,813,776 | 6/1974 | Frederickson . |
| 4,452,418 | 6/1984 | Urushihara et al. . |
| 4,588,174 | 5/1986 | Konishi .................. 267/141.2 X |
| 4,600,367 | 7/1986 | Terauchi et al. . |
| 4,666,122 | 5/1987 | Goodard . |

FOREIGN PATENT DOCUMENTS 57-61252 4/1982 Japan .

Primary Examiner—Alvin C. Chin-Shue
Attorney, Agent, or Firm—Banner, Birch, McKie & Beckett

[57] ABSTRACT

A mounting mechanism is disclosed, which connects a compressor of an automotive air conditioning system to an automobile engine through a mounting bracket. A bolt-nut mechanism connects the bracket to a flange portion projecting from the outer peripheral surface of the compressor. The bolt penetrates holes formed through the bracket and flange portions and an axial vibration absorbing unit disposed in either one of the holes. The absorbing unit includes an elastic member to absorb the axial vibration of the compressor. Coupling members connect between the mounting bracket and the compressor and are axially movable but not radially movable.

6 Claims, 7 Drawing Sheets

MOUNTING MECHANISM FOR AN AUTOMOTIVE AIR CONDITIONING COMPRESSOR

This application is a division of application Ser. No. 109,863, filed Oct. 19, 1987 now U.S. Pat. No. 4,834,336 issued 5.30.90.

TECHNICAL FIELD

This invention relates to a mountIng mechanIsm for a compressor, and more particularly, to an improved mounting mechanism for connecting a compressor in an automotive air conditioning system with an automobile engine through a mounting bracket.

BACKGROUND OF THE INVENTION

A compressor, which is used in an automobile air conditioning system, is usually mounted on the engine of the automobile through a suitable mounting bracket. A normal mounting arrangement generally comprises a projection extending radially from the housing of the compressor and at least one bracket. The bracket is fixed on the engine and the compressor is fixed to the bracket by bolts The compressor is thus mounted on the engine through the bracket.

Referring to FIG. 1, which illustrates the main portion of a conventional mounting mechanism, bracket 10 includes a base portion 101 fixed on the engine and flange portions 102 extending radially outwardly from base portion 101. A hole 102a is formed through an outer end portion of flange portion 102. A compressor 20 is also provided with a plurality of projections 201 extending radially outwardly from both end portions of the housing of compressor 20, and a hole 201a is formed through each projection 201. Adjacent projections 201 and flange portions 102 are connected by a bolt 30-nut 31 mechanism which includes washer elements 32. FIG. 1 illustrates one adjacent pair of projections 201 and flange portion 102, with another pair being located at the other end of the compressor housing. Compressor 20 is thus affixed on the engine through bracket 10.

In such a mounting construction, compressor 20 and mounting bracket 10, both of which are formed of high strength material, are directly connected through a bolt-nut mechanism. Mechanical vibration, more specifically vibration in the axial direction, which is generated by the operation of compressor 20, is thus transmItted directly to the engine causing loud noise. This noise is transmitted from the engine compartment to the passenger compartment o( the automobile.

One solution to the above disadvantages is disclosed in Japanese Utility Model Publication No. 57-61252. In this prior art publication, the compressor is connected with a mounting bracket by a bolt through a rubber member to thereby absorb the vibration of the compressor. However, the belt which is connected between the engine and the compressor should be under some tension in order to secure the transmission of rotating motion from the engine to the compressor The rubber member is therefore locked to obtain the tension.

SUMMARY OF THE INVENTION

It is a primary object of this invention to provide a mounting mechanism for a compressor in an automotive air conditioning sYstem whIch reduces the transmission of vibration produced by the compressor to an automobile engine, thereby preventing the production of objectionable noise.

It is another object of this invention to provide a mounting mechanism for a compressor in an automotive air conditioning system which can maintain a drive shaft of the compressor in parallel to a drive a shaft of an automobile engIne.

It is a further object of this invention to provide a mounting mechanism for a compressor in an automotive air conditioning system which has high durability.

A mounting mechanism in accordance with this invention includes a mounting bracket affixed on the engine, a flange portion projecting from the housing of the compressor and bolt-nut mechanisms to connect between the mounting bracket and compressor with a drive shaft of the compressor parallel to a drive shaft of the engine.

The mounting bracket has at least one first hole and the flange portion has at least one second hole. The first and second holes are aligned in the mounted position of the compressor An axial vibration absorbing mechanism is disposed in one of the first and second holes to absorb the axial vibration of the compressor, and a respective one of the bolts passes through the absorbing mechanism to connect the mounting bracket to the flange portion. A coupling mechanism is connected between the compressor and the mounting bracket to fix the radial spacing between the compressor and the mounting bracket.

In one embodiment the coupling mechanism comprises at least one pair of plates with on a end of each plate connected directly to the mounting bracket and the other end connected to the bolt passing through the absorbing mechanism. In another embodiment, the coupling mechanism comprises a supporting element disposed in the absorbing mechanism.

In a preferred embodiment, the absorbing mechanism has a first spacer member fixedly disposed within the hole, and a second spacer member extending within the first spacer member. An elastic member is fixedly disposed between the first and second spacer members.

Further objects, features and other aspects of this invention will be understood from the following detailed description of preferred embodiments of this invention with reference to the annexed drawings.

BRIEF DESCRIPTIONS OF THE DRAWINGS

DETAILED DESCRIPTION OF THE PREFERRED EMBODIMENTS

Figure 1:
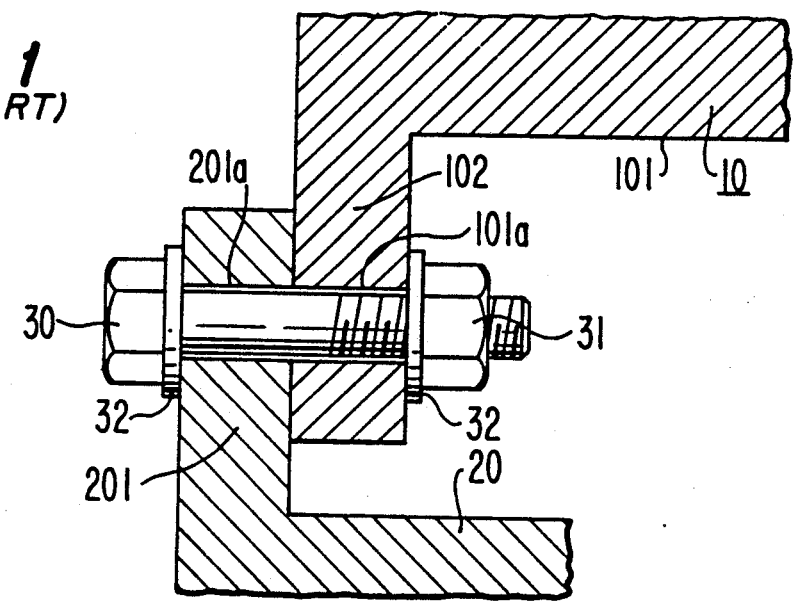
FIG. 1 is an enlarged cross-sectional view of a part of a conventional mounting mechanism for a compressor in an automotive air conditioning system.
Figure 2:
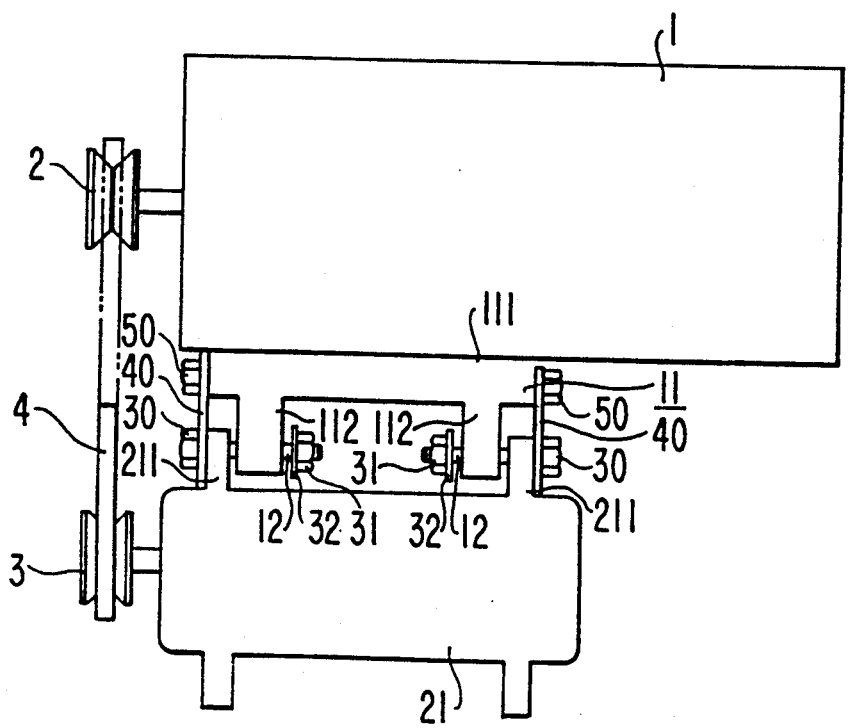
FIG. 2 is a diagrammatic view of a mounting mechanism for a compressor in an automotive air conditioning system in accordance with one embodiment of this invention.
Figure 3:
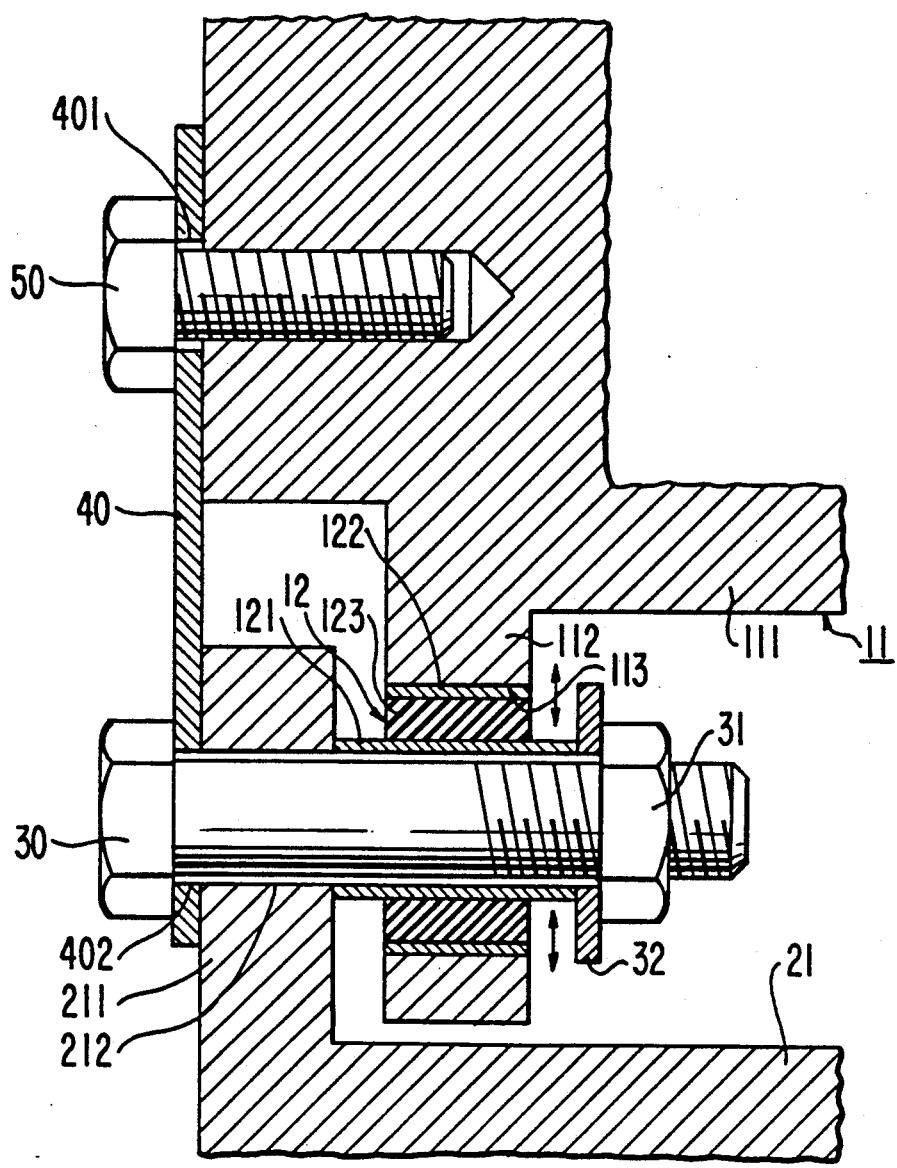
FIG. 3 is an enlarged cross-sectional view to a part of the mounting mechanism for a compressor in the automotive air conditioning system shown in FIG. 2.
Figure 4:
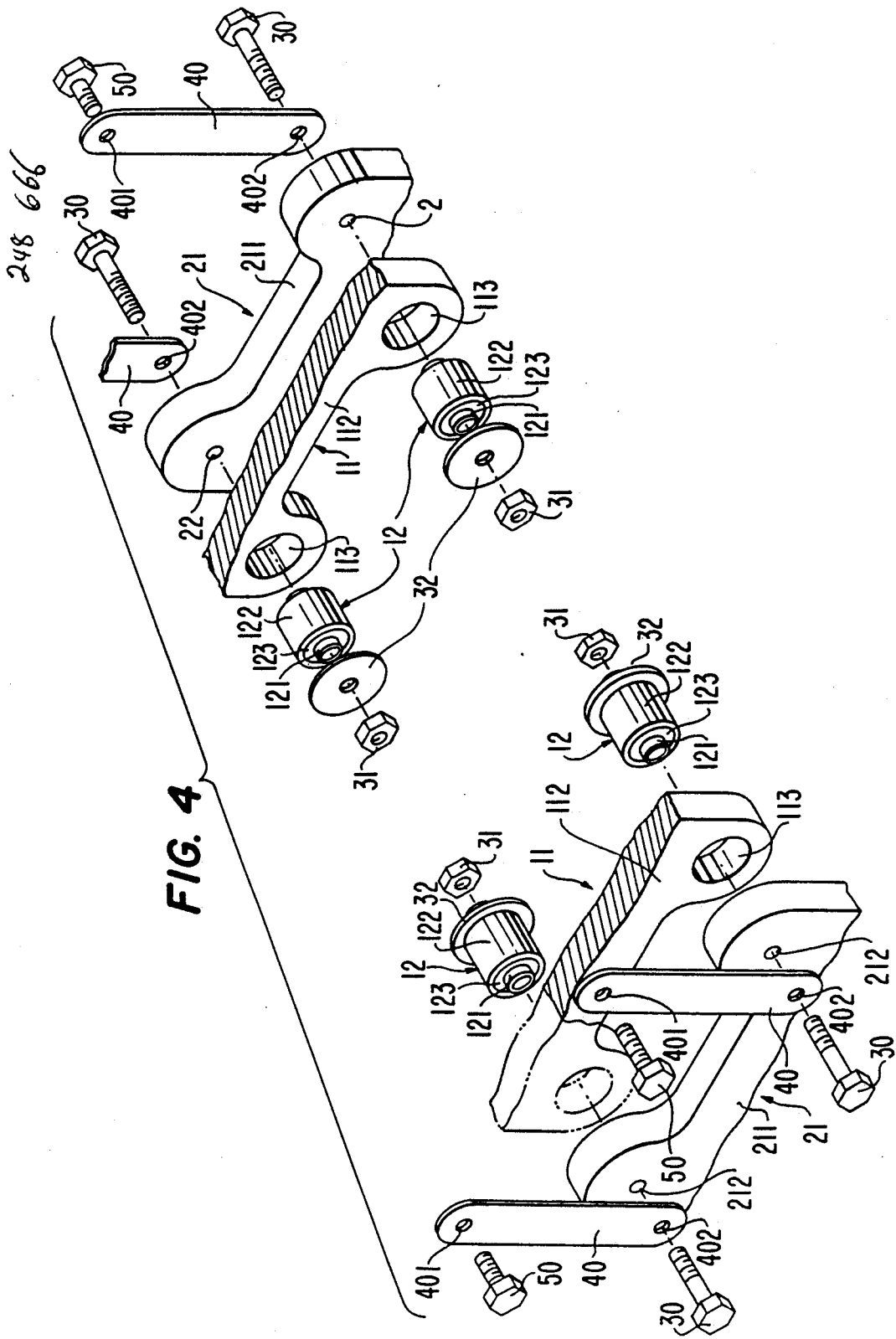
FIG. 4 is an exploded perspective view of the mountIng mechanism for a compressor in the automotive air conditioning system shown in FIG. 2.

With reference to FIGS. 2, 3 and 4, the construction of a mounting mechanism for a compressor in an automotive air conditioning system In accordance wIth one embodiment of this invention is shown. Automobile engine 1 has a pulley 2 on the terminal end of its drive shaft Compressor 21 also has a pulley 3 on the terminal end of its drive shaft. Rotational power from engine 1 is transmItted to compressor 21 through a drive belt 4, which is disposed on the outer surface of pulleys 2 and 3 thereby connecting engine 1 to compressor 21. Compressor 21 is mounted on automobile engine 1 through a mounting bracket 11. Mounting bracket 11 includes a base portion 111 affixed to the engines and a plurality of flange portions 112 projecting radially (radial with respect to the compressor and engine drive shafts) outward from both end portions of base portion 111 and perpendicular to engine 1. A hole 113 is formed through each flange portion 112. An absorbing unit 12 is disposed in each hole 113 of flange portions 112. An absorbing unit 12 includes a radially inner or inside ring spacer 121, a radially outer or outside ring spacer 122 and a cylindrical elastic member 123 made of elastic, vibration absorbing material, such as a vibro isolating rubber. The length of inside ring sPacer 21 is longer than that of outside ring spacer 122. Elastic member 123 is attached on the outer surface of inside ring spacer 121 by a vulcanizable adhesive, and outside ring spacer 122 is also affixed on the outer surface of elastic member 123 by a vulcanizable adhesive Compressor 21 has a plurality of flanges 211 projecting radially outward from both end portions of the housing of compressor 21. A hole 212 is formed through each flange 211. Coupling plates 40, which have holes 401, 402 at their both ends, respectively, are connected between mounting bracket 11 and compressor 21. That is, each coupling plate 40 is fixed on one end surface of mounting bracket 11 by a screw bolt 50; and the other end of coupling plate 40 is fixed on the outer end surface of flanges 211 of compressor 21 by a screw bolt 30 and a nut 31. Coupling plates 40 are made of high strength materials, such as stainless steel or aluminum, and have the characteristic of being able to bend in the axial direction of compressor 21. However, in view of the high strength of the material, plates 40 are non-compressible in the radial direction. When compressor 21 is assembled on mounting bracket 11, one outer end surface of inside ring spacer 121 is attached agaInst the side surface of flange 211 of compressor 21, so that the fixed position of the compressor is easily determined. Also, the other end surface of inside ring spacer 211 is attached against a nut 31 through a washer 32.

Figure 5:
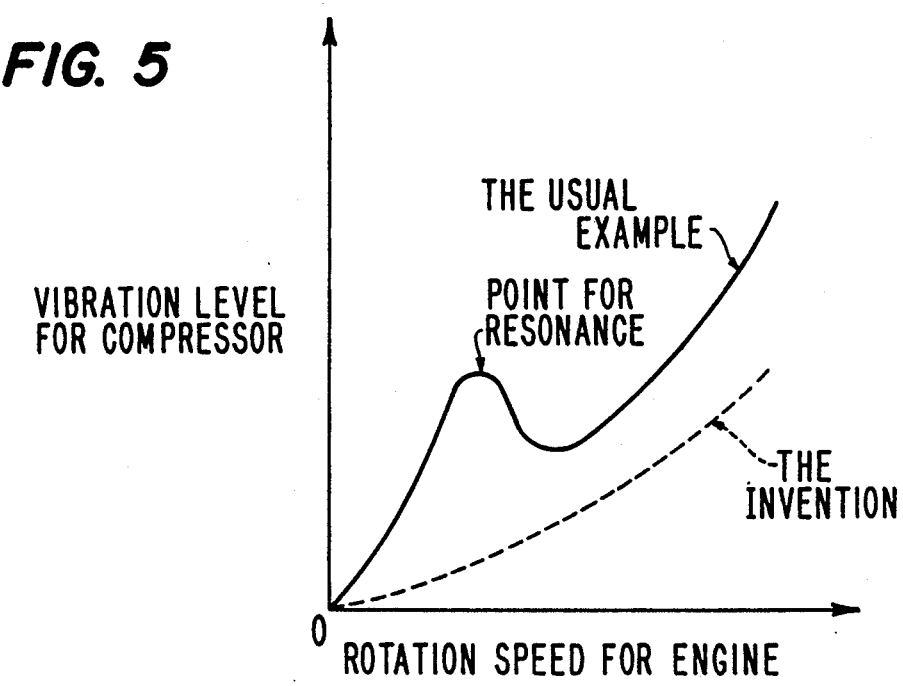
FIG. 5 is a graph showing the relationship between the rotational speed of an automobile engine and the level of vibration of a compressor.

According to this invention, when engine 1 starts, driving power is transmitted from engine 1 to compressor 21 through belt 4, and compressor 21 is thus driven. During operation of compressor 21, although mechanical vibration is produced both axially and radially within compressor 21, the mechanical axial vibration which causes noise in the passenger compartment of the automobile is reduced by elastic member 123 of absorbing unit 12. Therefore, the noise produced in the engine compartment and transmitted to the passenger compartment is reduced, thereby improving the comfort of the automobile. Furthermore, since compressor 21 and mounting bracket 11 are fixedly connected by coupling plate 40, which is made of a high strength material, engine 1 and compressor 21 move together according to the condition of the mechanical radial vibration of engine 1. That is, the radial distance between compressor 21 and engine 1 remains constant in view of the strength of coupling plates 40. Therefore, resonance between engIne I and compressor 21 is prevented as shown in FIG. 5, and durability of elastic member 123 is improved. Furthermore, when belt 4 is placed on pulleys 2, 3, deformation of elastic member 123, and lack or loss of tension of belt 4, is also prevented. Compressor 21 is also grounded through coupling plates 40, which are preferably made of metallic, electrically conductive material.

Figure 6:
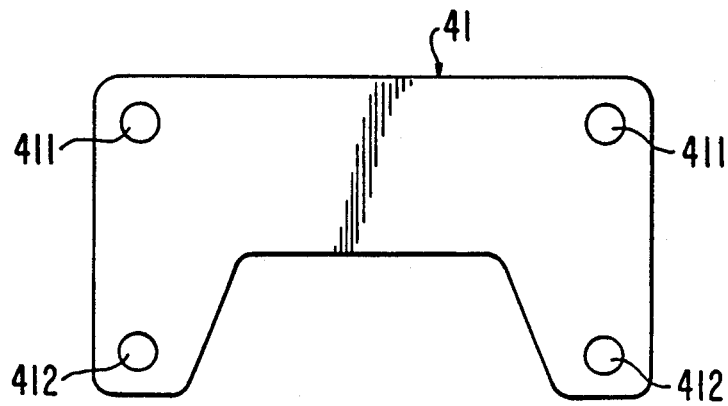
FIG. 6 is a front view of a coupling plate of a mounting mechanism for a compressor in an automotive air conditioning system in accordance with another embodiment of this invention.
Figure 7:
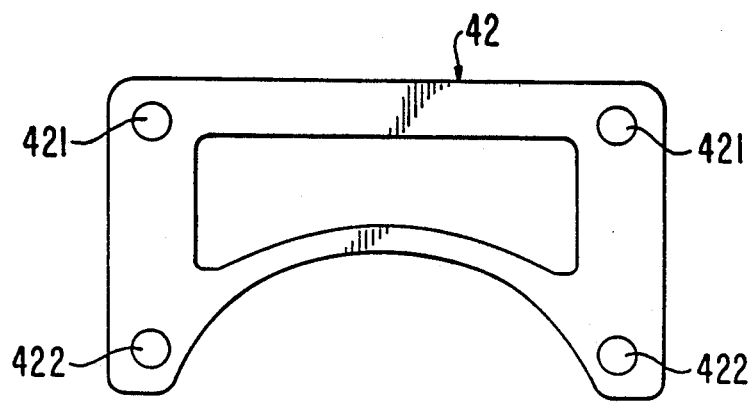
FIG. 7 is a front view of a coupling plate of a mounting mechanism for a compressor in an automotive air conditioning system in accordance with still another embodiment of this invention.

Referring to FIG. 6, an alternate configuration of a coupling plate is illustrating wherein the coupling plate is formed jn a flat plate shape which extends across a substantial portion of the width of the compressor. Coupling plate 41 has two pairs of holes 411, 412 and is cut-out at its bottom end to be lightweight. Holes 412 of coupling plate 41 are preformed at the location corresponding to holes 112 of flanges 111 of mounting bracket 11 when one end of coupling plate 41 is fixed on one end surface of mounting bracket 11 by screw bolts 50. Therefore, alignment of holes 412 of coupling plate 41 to holes 112 of flanges 111 is easily made. If the weight of the coupling plate needs to be reduced the plate illustrated in FIG. 7 can be used wherein the central portion of plate 42 is hollowed out or removed.

Figure 8:
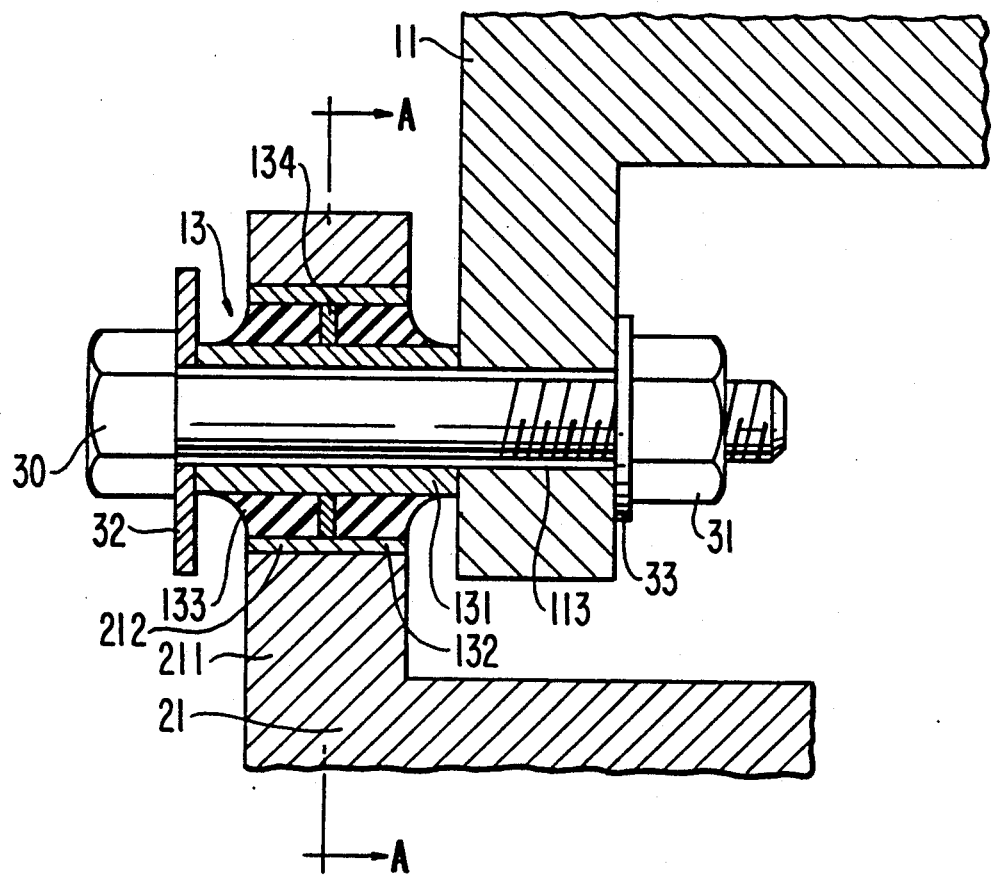
FIG. 8 is an enlarged cross-sectional view of a part of a mounting mechanism for a compressor in an automotive air conditioning system in accordance with still another embodiment of this invention.
Figure 9:
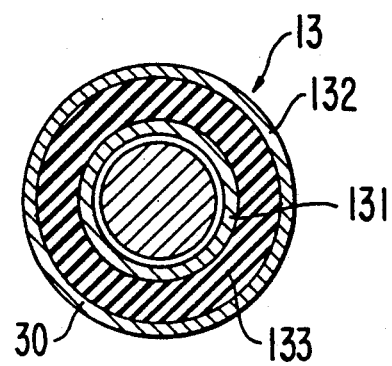
FIG. 9 is a transverse cross-sectional view of an absorbing device of the mounting mechanism of FIG. 8 taken generally along line A-A in FIG. 8.

With reference to FIGS. 8 and 9, the construction of a mounting mechanism for a compressor in an automotive air conditioning system In accordance with a further embodiment of this invention is shown. An absorbing unit 13 includes an inside ring spacer 131, an outside ring spacer 132 and a ring plate 134 covered by an elastic member 133. Ring plate 134 extends radially between spacers 131 and 132. Plastic member 133 is made of elastic material, such as a vibroisolating rubber, and has a generally cylindrical configuration. Inside ring spacer 131, outside ring spacer 132 and ring plate 134 are made of a high strength, substantially non-compressible material such as metal. Elastic member 133 is affixed on the outer surface of inside ring spacer 131 by a vulcanizable adhesive, and outside ring spacer 132 is also affixed on the outer surface of elastic member 133 by a vulcanizable adhesive Ring 134 is formed so that its outer surface contacts the Inner surface of outside ring spacer 132 and its inner surface contacts the outer surface of inside ring spacer 121.

Absorbing unit 13 is fixedly disposed in holes 212 through flanges 211 of compressor 21 by a vulcanizable adhesive. Bolts 30 pass through absorbing unIt 12 and holes 112 of flanges 111 of mounting bracket 11 to fix compressor 21 on mounting bracket 11. In this construction, ring 134 accomplishes the same function as coupling plate 40 mentioned in the above embodiments, so that coupling plate 40 is not necessary. That is ring 134 fixes the radial spacing between compressor 21 and engine 1, thereby preventing radial movement of the compressor relative to the engine.

Figure 10A:
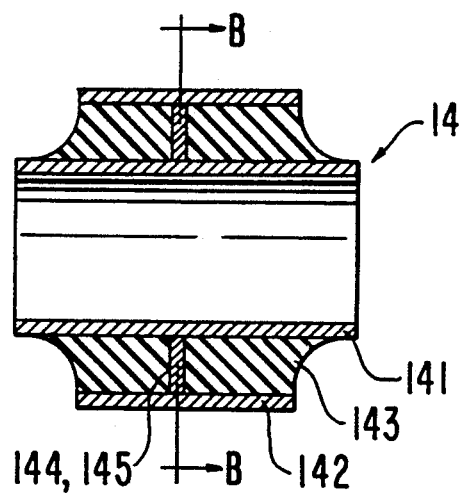
FIG. 10(a) is a longitudinal cross-sectional view of an absorbing device in accordance with still another embodiment of this invention.
Figure 10B:
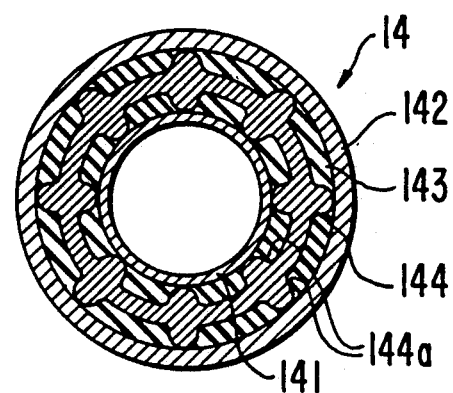
FIG. 10(b) is a transverse cross-sectional view taken generally along line B-B shown in FIG. 10(a).

With reference to FIGS. 10(a) and 10(b), the construction of an absorbing unit in accordance with a further embodiment of this invention is shown. An absorbing unit 14 includes an inside ring spacer 141, an outside ring spacer 142 and a ring plate 144 which is covered by an elastic member 143 located between spacers 141 and 142. Ring plate 144 has cut-out portions 144a at regular intervals along its outer and inner circumferences. Therefore, ring plate 144 contacts the outer surface of inside ring spacer 141 and the inner surface of outside ring spacer 142 at a plurality of small lines between cut-out portions 144a. In this embodiment, since cut-out portions 144a are formed along the outer and inner circumferences of ring 144, absorbing assembly 14 may be easily bent axially.

Figure 10C:
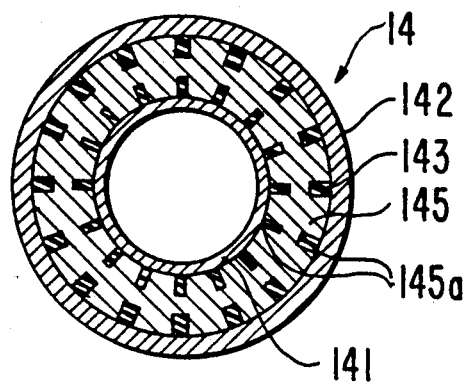
FIG. 10(c) is a transverse cross-sectional view similar to FIG. 10(b) illustrating a variation of the absorbing device of FIG. 10(a).

FIG. 10(c) illustrates an alternate way of forming the cut-outs in the ring plate, wherein ring plate 145 is provided with many small cut-out portions 145a at regular intervals along its outer and inner circumferences.

Figure 11A:
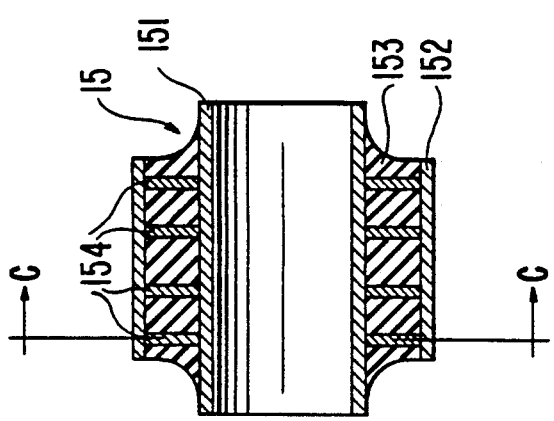
FIG. 11(a) is a longitudinal cross-sectional view of an absorbing device in accordance with still another embodiment of this invention.
Figure 11B:
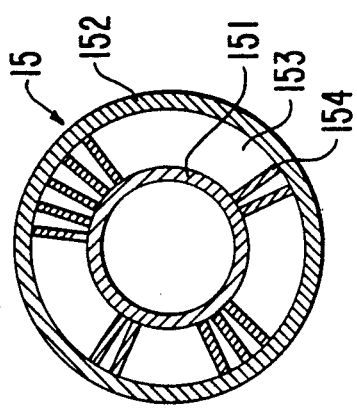
FIG. 11(b) is a transverse cross-sectional view taken along line C-C in FIG. 11(a).

Referring to FIGS. 11(a) and 11(b), an absorbing unit embodiment is illustrated wherein the ring plate is replaced with a plurality of fiber bits 154, which extend radially, are covered by elastic member 153. Each fiber bit 154 is made of a high strength material, for example, metal, carbon or hard plastics. Fiber bits 154 are disposed in an array at regular angular intervals between an inside ring spacer 151 and an outside ring spacer 152. The outer end surface of fiber bits 154 thus contacts the inner surface of outside ring spacer 152 and the inner end surface of fiber bits 154 contacts the outer surface of inside ring spacer 151. All the bits 154 are preferably identical to one another. In this embodiment, absorbing unit assembly 15 may be more easily bent axially, yet remain radially non-compressible.

Figure 12A:
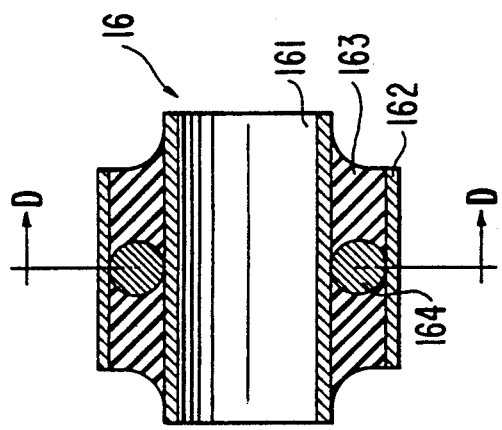
FIG. 12(a) is a longitudinal cross-sectional view of an absorbing device in accordance with still another embodiment of this invention.
Figure 12B:
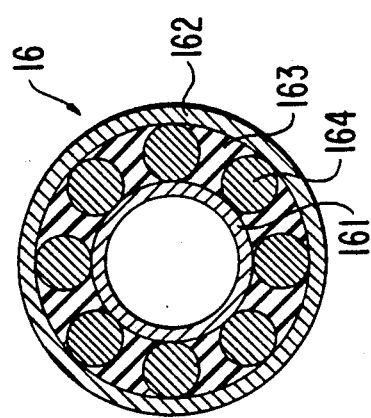
FIG. 12(b) is a transverse cross-sectional view taken along line D-D in FIG. 12(a).

Referring to FIGS. 12(a) and 12(b), an absorbing unit embodiment is illustrating wherein the ring plate is replaced by a plurality of spherical members 164, which are covered by an elastic member 163. Spherical members 164 are disposed at regular angular intervals along the circumference of inside ring spacer 161. The diameter of each spherical member 164 equals the radial gap between the outer surface of inside ring spacer 161 and the inner surface of outside ring spacer 162 so that spherical member 164 can receive radial forces. Therefore, the outer surface of spherical members 164 contacts the surfaces of the spacers at a plurality of point contacts. Instead of using spherical members, ⓒval members can be used under the condition that the end surfaces of the oval member along their long diameter contact the inner surface of the outside ring spacer and the outer surface of the inside ring spacer, respectively.

This invention has been described in detail in connection with the preferred embodiment but those are examples only and the invention is not restrictⓔd thereto. It will be easily understood by those skilled in the art that variations and modifications can be easily made within the scope of this invention.

We claim:

1. In a mounting mechanism for connecting a compressor of an automobile air conditioning system in a mounted position on an automobile engine, said mounting mechanism including a mounting bracket affixed to the engine, a flange portion projecting from an outer peripheral surface of the compressor, and bolt-nut mechanisms connectings between the mounting bracket and the flange portion of the compressor with a drive shaft of the compressor being disposed parallel to a drive shaft of the engine such that the compressor and the engine are spaced in a radial direction perpendicular to the axis of the drive shafts, the improvement comprising:

said mounting bracket having at least one first hole, said flange portion having at least one second hole, said first and second holes being aligned with one another in the mounted position of the compressor;

axial vibration absorbing means comprising a vibration absorbing material formed in the shape of a cylinder and disposed in one of said first and second holes for absorbing axial vibration of the compressor, a respective one of the bolts of said bolt-nut mechanisms passing through said axial vibration absorbing means to connect the mounting bracket to the flange portion; and spacing means incorporated within said vibration absorbing means for fixing the radial spacing between the compressor and the engine and preventing radial deformation of the vibration absorbing means, said spacing means comprising a plurality of elements disposed within said cylinder of vibration absorbing material, extending generally radially in said cylinder and being substantially non-compressible in the radial direction, and said elements comprising at least three spherical members disposed at generally regular angular intervals.

2. The mounting mechanism of claim 1 wherein said spacing means is made of a high strength material.

3. The mounting mechanism of claim 1 wherein said vibration absorbing material is a vibroisolating rubber.

4. In a mounting mechanism for connecting a compressor of an automobile air conditioning system in a mounting position on an automobile engine, said mounting mechanism including a mounting bracket affixed to the engine, a flange portion projecting from an outer peripheral surface of the compressor, and bolt-nut mechanisms connecting between the mounting bracket and the flange portion of the compressor with a drive shaft of the compressor being disposed parallel to a drive shaft of the engine such that the compressor and the engine are spaced in a radial direction perpendicular to the axis of the driving shafts, the improvement comprising:

said mounting bracket having at least one first hole, said flange portion having at least one second hole, said first and second holes being aligned with one another in the mounted position of the compressor;

axial vibration absorbing means comprising a vibration absorbing material and disposed in one of said first and second holes for absorbing axial vibration of the compressor, a respective one of the bolts of said bolt-nut mechanisms passing through said axial vibration absorbing means to connect the mounting bracket to the flange portion, said vibration absorbing means further comprising inside and outside cylindrical spacers substantially concentrically positioned with respect to one another and forming an annular space therebetween, said vibration absorbing material being formed in the shape of a cylinder and disposed in said annular space; and spacing means incorporated within said vibration absorbing means for fixing the radial spacing between the compressor and the engine and preventing radial deformation of the vibration absorbing means, said spacing means comprising at least three substantially rigid spherical members said spacers and in contact therewith, and disposed within said cylinder of vibration absorbing material and at generally regular angular intervals.

5. The mounting mechanism of claim 4 wherein said spacing means is made of a high strength material.

6. The mounting of claim 4 where said vibration absorbing material is a vibroisolating rubber.

* * * * *